3,350,428
CONTINUOUS SULFONATION PROCESS
Richard J. Brooks and Burton Brooks, Seattle, Wash., assignors to The Chemithon Corporation, Seattle, Wash., a corporation of Washington
Filed Oct. 31, 1963, Ser. No. 320,301
16 Claims. (Cl. 260—400)

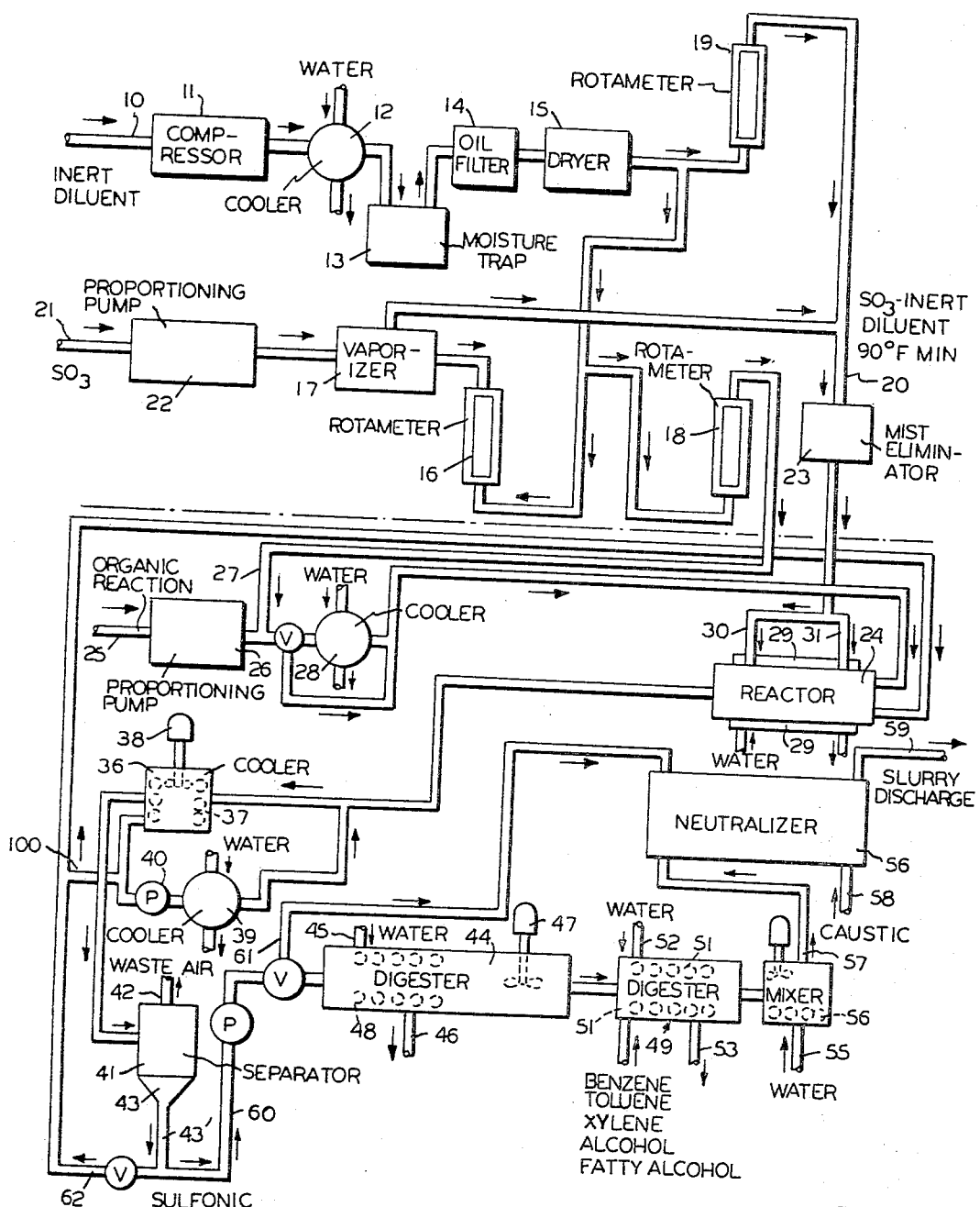

This application is a continuation-in-part of application Ser. No. 244,096, filed Dec. 12, 1962, and now U.S. Patent No. 3,259,645.

This invention relates to a process for the sulfonation of organic reactants, and relates more particularly to an improved process for the rapid and continuous sulfonation of alkyl aryl hydrocarbons, fatty alcohols, ethoxylated alkyl phenols and other sulfonatable organic compounds.

The term "sulfonating," as employed hereinafter in the specification and in the claims, is used sometimes in its generic sense as applying both to true sulfonating and to sulfating, and sometimes in its specific sense, that is, to true sulfonating. Where the context in which the term "sulfonating" is used does not require the specific sense, it is to be construed generically.

Organic sulfonic acids and organic sulfonates are becoming increasingly important due to their use in the preparation of liquid detergents, particularly in the preparation of relatively salt-free detergents having good solubility characteristics. Normally, the sulfonated detergents are prepared by sulfonation processes employing concentrated sulfuric acid or oleum. In such processes, the reaction mixture contains a residue of sulfuric acid and water as a byproduct. Unless special techniques are followed, the separation of the desired reaction product from the final reaction mixture is extremely difficult. Moreover, due to the presence of the residual sulfuric acid in the final reaction mixture, when neutralizing the so-formed sulfonated product with, for example, sodium hydroxide, the residual acid is neutralized along with the sulfonated product, the residual acid forming sodium sulfate. While the use of sodium sulfate is desirable for some purposes, its use is definitely undesirable for other purposes, particularly in processes for the preparation of salt-free detergents having good solubility characteristics. In the latter processes, the sodium sulfate must be removed.

There has developed a great interest in the production of salt-free detergents by the use of sulfur trioxide due to the facts, on the one hand, that the oleum is in short supply, and, on the other hand, of the necessity for discharging spent acid, both major problems in many of the countries of the world. Sulfur trioxide in stabilized form is highly satisfactory as a sulfonating agent, and it is possible for even the small consumer to buy the same in small drum quantities for use in the preparation of salt-free detergents. A stabilized liquid sulfur trioxide having a more than 99 percent available sulfur trioxide content, sold commercially under the trade name "Sulfan," is useful in the instant invention.

Prior efforts to develop a sulfur trioxide/air sulfonation process, however, were unsatisfactory in that a yellow or brown colored detergent was generally obtained. This discolored product required bleaching in order to compete with the products obtained by oleum sulfonation, which bleaching step added considerably to the cost of production. Moreover, the resultant bleached product was still substantially inferior in both color and quality to the sulfonates produced by the prior art processes employing oleum.

Gilbert, in U.S. Patent No. 2,723,990, describes one of the prior methods for sulfur trioxide sulfonation by the batch system, wherein a heel of sulfuric acid is added to lower the viscosity of the organic reactant, after which the sulfur trioxide, mixed with air in a concentration of about 5%, is introduced. The difficulty with this system is that the heel of sulfuric acid, to a great extent, overcomes the advantage of the sulfur trioxide process, namely, obtaining a substantially salt-free product.

Other disadvantages encountered when employing a batch system for producing organic sulfonates are the inherent difficulties in agitation and/or temperature control. Many attempts have heretofore been made to modify the batch system to overcome the deficiencies thereof. Thus, for example, one method formerly employed was to cause a tank containing a sulfonation reaction mixture to overflow into a series of tanks in order to provide a semi-continuous sulfonation process. The results, however, were not entirely satisfactory in that the quality and yield of the product varied, and/or a product of good color characteristics was not obtained.

Thus, prior to the instant invention, it generally has not been considered commercially practicable to develop a fully continuous sulfonation process wherein a high degree of purity as well as optimum yields could be obtained.

It is therefore the principal object of this invention to provide a continuous process for the sulfonation of organic reactants which is free from the disadvantages of the prior processes.

Another object of the present invention is to provide an extensively rapid and fully continuous process for the sulfonation of alkyl aryl hydrocarbons, fatty alcohols and other sulfonatable organic materials.

A further object of the present invention is to provide a fully continuous sulfonation process in which the organic reactants may be continuously fed and the resultant reaction products continuously withdrawn at controlled temperatures and pressures.

Still another object of the present invention is to provide a fully continuous sulfonation process in which there is very little hold-up time in the processing equipment employed.

A still further object of the present invention is to provide a fully continuous sulfonation process which is adapted to be carried out in processing equipment that is simple to control and requires relatively small plant space.

An additional object of the present invention is to provide a fully continuous sulfonation process wherein a sulfonated product is prepared which easily can be separated from the product mixture obtained.

Yet another object of the present invention is to provide a fully continuous sulfonation process wherein a substantially salt-free sulfonated product is obtained in relatively high yield.

Still an additional object of the present invention is to provide a fully continuous sulfonation process wherein a sulfonated product of excellent and uniform quality is obtained in commercially attractive yields.

A particular object of the present invention is to provide a fully continuous sulfonation process wherein a reactant mixture cooling technique is employed which results in a sulfonated product being obtained which requires no bleaching and is of good color, odor and purity.

The above-mentioned and other objects and advantages of the present invention will become apparent as the invention is more thoroughly discussed hereinafter.

Broadly described, the present invention provides a continuous process for sulfonating a sulfonatable organic reactant, preferably an organic reactant selected from the group consisting of compounds having an olefinic linkage, compounds having an aromatic nucleus, and compounds having an alcoholic hydroxyl group, wherein said organic reactant is reacted with sulfur trioxide to provide a corresponding sulfonic acid, which comprises introducing into an externally cooled reaction zone (1) a stream of said organic reactant and (2) a stream of a mixture of sulfur trioxide and an inert diluent, thoroughly mixing said organic reactant and said sulfur trioxide-containing mixture in said reaction zone for a time period of at most about 10 seconds to provide a reaction mixture in the form of a film having a thickness of at most about 0.04 inch, preferably in the range of from about 0.001 to about 0.04 inch, removing said reaction mixture from said reaction zone at the end of said time period, and immediately introducing said reaction mixture withdrawn from said reaction zone into a cooling zone to effect a rapid cooling of said reaction mixture and provide a sulfonic acid-rich mixture.

The invention also contemplates embodiments of the above-described process wherein, subsequent to said rapid cooling of said reaction mixture, said sulfonic acid-rich mixture is withdrawn from said cooling zone, said inert diluent and unreacted sulfur trioxide is separated therefrom, and the resulting mixture is passed to a digestion zone and maintained therein for an additional time period while being agitated without substantial back-mixing, to substantially complete the reaction.

In contrast to the prior art sulfur trioxide/air processes which resulted in a yellow or brown colored detergent that had to be bleached to compete with the products produced by oleum sulfonation, it has been unexpectedly found, in accordance with the present invention, that a commercially satisfactory, fully continuous sulfonation process can be successfully carried out if there is careful control of certain of the process variables during sulfonation. The sulfonation process of this invention produces an excellent yield of products which are substantially white, thereby requiring no bleaching.

The conditions which are utilized and controlled in the instant method are the following:

(a) the temperatures of the entering sulfur trioxide/inert diluent mixture and the organic reactant;
(b) the temperature of reaction in the reaction zone;
(c) the removal of mist from the entering sulfur trioxide-containing gas;
(d) the concentration of the sulfur trioxide/inert diluent mixture;
(e) the thorough agitation and mixing of the reactant streams in the reaction zone;
(f). the thickness of the film of the reaction mixture in the reaction zone;
(g) the maintenance and reaction time in the reaction zone;
(h) the velocity of the sulfur trioxide/inert diluent mixture in the reaction zone;
(i) the immediate and rapid cooling of the reaction mixture leaving the reaction zone in the cooling zone;
(j) the separation of unreacted sulfur trioxide from the reaction mixture after cooling same and preliminary to the digestion thereof; and
(k) the digestion of the reaction mixture after leaving the cooling zone and separation of unreacted sulfur trioxide therefrom, the digestion being carried out while employing thorough agitation and substantially without allowing back mixing.

It has unexpectedly been found that with the use of the present method wherein thorough and vigorous mixing of the reactant streams is effected under controlled temperature conditions and the resultant reaction mixture immediately thereafter is subjected to the described rapid cooling, the problem of controlling both the viscosity of sulfonic acids as well as the extremely reactive nature of sulfur trioxide which has plagued prior art sulfonation processes is alleviated. In prior art processes, when sulfur trioxide is injected into a once-through reaction stage, the exothermic reaction with the organic reactant is instantaneous and not suitably controlled, with the result that the heat of the reaction causes the temperature of the reaction products to rise very rapidly, causing deterioration and degradation of the final product as well as poor product color. This problem has now been completely overcome in the instant invention.

The present invention contemplates the utilization of any organic reactant which is reactive with sulfur trioxide to provide a sulfonated product. The method of the present invention is particularly applicable to the sulfonation of organic compounds which contain an aromatic nucleus, organic compounds which contain an olefinic linkage, and organic compounds which contain an alcoholic hydroxyl group, which organic compounds yield, upon the sulfonation thereof, surface active materials. Such sulfonatable organic compounds utilized in the invention include, without limitation, olefins containing from about 8 to about 20 carbon atoms, such as octene, decene, dodecene, tetradecene, hexadecene, octadecene, eicosene, tetradecadiene, and octadecadiene, olefinically unsaturated acids such as oleic acid and linoleic acid; fatty alcohols containing from 8 to about 20 carbon atoms, such as octyl alcohol, decyl alcohol, lauryl alcohol, tridecyl alcohol, tetradecyl alcohol, cetyl alcohol, tallow alcohol, octadecyl alcohol, and eicosyl alcohol; ethoxylated derivatives of the above fatty alcohols, such as polyoxyethylene ethers of lauryl alcohol and tridecyl alcohol; ethoxylated derivatives of alkyl phenols wherein the alkyl group contains from about 8 to about 16 carbon atoms, such as nonylphenyl polyoxyethylene ethers; ethoxylated derivatives of partial esters of polyhydric alcohols such as polyoxyethylene ethers of lauric acid partial esters of sorbitol; and monocyclic and polycyclic aromatic hydrocarbons and alkyl substituted derivatives thereof wherein the alkyl group contains up to about 20 carbon atoms, such as benzene, biphenyl, naphthalene, toluene, xylene, ethyl benzene, propyl benzene, butyl benzene, dibutyl benzene, hexyl benzene, octyl benzene, nonyl benzene, decyl benzene, dodecyl benzene, tridecyl benzene, tetradecyl benzene, hexadecyl benzene, octadecyl benzene, nonyl toluene, decyl toluene, dodecyl toluene, tetradecyl toluene, dodecyl xylene, dodecyl ethyl benzene, dodecyl isopropyl benzene, methyl biphenyl, ethyl biphenyl, propyl biphenyl, butyl biphenyl, dipropyl biphenyl, dibutyl biphenyl, hexyl biphenyl, octyl biphenyl, decyl biphenyl, tetradecyl biphenyl, octadecyl biphenyl, dodecyl methyl biphenyl, isopropyl tetradecyl biphenyl, methyl naphthalene, ethyl naphthalene, isopropyl naphthalene, butyl naphthalene, diisopropyl naphthalene, dibutyl naphthalene, hexyl naphthalene, octyl naphthalene, decyl naphthalene, tetradecyl naphthalene, octadecyl naphthalene, dodecyl methyl naphthalene, ethyl tetradecyl naphthalene, and the like.

As the organic reactant, the invention also contemplates the utilization of sulfonatable organic compounds which themselves or precursors thereof have been subjected to a preliminary sulfonation treatment whereby double or polysulfonated products are produced.

The alkyl benzenes which are preferred for utilization in the practice of the present invention are well known in the art and can be conveniently represented by the formula

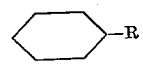

wherein R is an alkyl radical, either straight or branched chain, containing at least 8 carbon atoms, and preferably from 8 to 20 carbon atoms. Such alkyl benzenes and their preparation are disclosed in a large number of U.S. patents, illustrative of which are U.S. Patents Nos. 1,992,160; 2,161,173; 2,210,902; 2,218,472; 2,223,364; 2,220,099; and 2,597,834.

Sulfur trioxide used in the present invention suitably may be made in various ways, such as, for example, by carefully metering and burning sulfur and catalytically oxidizing the resultant sulfur dioxide to sulfur trioxide, and thereafter feeding the resultant sulfur trioxide/air mixture directly to the organic reactant to sulfonate the later. Furthermore, a side stream of converter gas from a sulfuric acid manufacturing plant may be metered and utilized as the sulfonating agent for the organic reactant. Also, $SO_3$ can be prepared by stripping the $SO_3$ gas from concentrated oleum. In accordance with the instant invention, the sulfur trioxide for use in the process of this invention is preferably first diluted with inert gas such as air, nitrogen, carbon dioxide, etc.

In accordance with the instant invention, the sulfur trioxide enters the system under pressure in a controlled stream of inert diluent which gives it added velocity, and at the same time the concentration of the entering sulfur trioxide is also controlled, preferably from about 2% to about 8% by volume. The pressure at which the reactants enter the system is also of importance because as the back pressure of the entering reactants increases, the reactivity of the sulfur trioxide gas also increases. However, in the present invention a relatively low pressure is required for passage of the sulfur trioxide/inert diluent mixture through the system. The sulfur trioxide/inert diluent stream generally enters the system under a pressure ranging up to about 75 p.s.i.g., preferably from 10 to about 15 p.s.i.g. It has been found that pressures above 75 p.s.i.g. are increasingly harmful to the final product quality. Also, the velocity of the sulfur trioxide/inert diluent stream should be at least about 75 feet per second.

The amount of sulfur trioxide employed is also an important factor in the present invention, particularly with regard to the specific classes of materials which can be sulfonated. For example, when substituted aromatics are employed, e.g., dodecyl benzene, as the material to be sulfonated, generally an excess, preferably 8 to 10 mole percent excess, of sulfur trioxide is employed. However, when utilizing tridecyl benzene, which does not sulfonate as completely or as readily as dodecyl benzene, a somewhat greater mole excess preferably is used, e.g., a 10 to 15 mole percent excess. A fatty alcohol, when used as the organic reactant, degrades quite easily when side reactions take place; accordingly, it is preferred to utilize from about a 15% mole deficiency to about a 6 mole percent excess of sulfur trioxide.

Xylene and toluene present a different problem, for these materials form sulfones and the larger the excess of sulfur trioxide used, the more sulfone formation takes place. In order to avoid sulfone formation, it is essential that the sulfonation take place with a deficiency of sulfur trioxide, e.g., about 60% sulfur trioxide based on the moles of hydrocarbon feed. The unreacted xylene and toluene may be extracted and recycled back through the process.

Non-ionics such as nonyl phenol present another problem when they are being sulfonated. Thus, it is possible to sulfate or sulfonate a non-ionic on the ring, but ring sulfonates are not desirable as detergents. Therefore, in accordance with the instant invention, ring sulfonation is to be avoided. Accordingly, with non-ionics the mole excess of sulfur trioxide employed should be between 0 and about 6 percent, depending upon the particular non-ionic.

In accordance with the method of the present invention, the sulfur trioxide/inert diluent mixture is introduced into the reaction zone at a temperature which generally is somewhat lower than the average temperature of the reaction mixture in the reaction zone. In the preferred embodiments of the invention, the temperature of the sulfur trioxide/inert diluent mixture is in the range of from about 90° to about 120° F.

Another factor that has caused poor product color in previous sulfonation processes has been the presence of sulfuric acid and/or sulfur trioxide mist in the gaseous sulfur trioxide sulfonating agent when it enters the reactor. This mist can be formed by small traces of moisture present in the inert diluent which react with the sulfur trioxide upon the mixing thereof to form sulfuric acid droplets if the mixture is allowed to cool to too low a temperature. In the instant process, any mist present preferably is removed from the sulfur trioxide/inert diluent stream prior to its introduction into the reactor.

Another feature of this invention which has been found to give a more completely pure sulfonated product is the introduction of the reactants into the process at as low a temperature as possible consistent with obtaining adequate mixing, since the lower the temperature of the reaction the better the quality of the final product. In order to maintain optimum conditions throughout each stage of the process, the reaction between the sulfur trioxide and the reactants should take place at as low a temperature as possible until the viscosity of the reactants starts to rise to a high value. When this increased viscosity occurs, the temperature is permitted to rise, keeping the viscosity at a fairly constant value.

With regard to the actual feed temperatures of the organic reactants used in the process of the instant invention, it is preferred to first mix the organic reactant with air and thereafter pass the resulting mixture through a heat exchanger wherein it is cooled or heated to the lowest practical temperature consistent with its being in liquid form. Accordingly, when an alkyl benzene is employed as the reactant, i.e., the material to be sulfonated, the temperature of the material added to the reaction zone may be as low as 0° F. Other aromatics and aromatic-containing compounds, such as benzene, toluene, xylene, and the like, may be precooled to temperatures similar to that employed for alkyl benzene, if desired. When using a fatty alcohol as the organic reactant, such as, for example, lauryl alcohol, which is solid at room temperature, it must be heated to a temperature of about 85° F. whereby the reactant will be melted. Tallow alcohol, when employed, may have to be heated somewhat higher, for example, up to a temperature of about 125° F. Furthermore, when a non-ionic, which is liquid at room temperature but very viscous, is employed, it has to be warmed somewhat, for example, up to a temperature of 90° F., and maintained at a constant temperature so that when it is metered to the reaction zone through a rotameter, the metering is always accurate. In the process of this invention, it was found useful to use a temperature controlled storage tank for each of the organic reactants so that they will always be fed to the reaction zone at a constant temperature.

One of the major problems present in the prior art sulfonation processes has been the inability to control the viscosity of the products at various stages of reaction, with the result that poor product color and low purity were always evidenced in the final product due to the inability to adequately mix the sulfur trioxide with the product. However, this problem has been obviated in the instant process by employing adequately high temperatures to control viscosity during the introduction of the reaction mixture into the reaction zone, coupled with thorough and vigorous agitation therein and thereafter instantly cooling the reaction mixture. The viscosity of the product-reactant mixtures in the process of this invention is reduced at the higher temperatures, and mixing is more efficient when the reactants come in contact with the sulfur trioxide. Thus, the problem of controlling the viscosity of the reactants is directly related to the temperature at each stage of reaction, which temperature, in turn, is based upon the quantity of fresh reactants used in the reaction and the temperature at which the reactants enter the reaction zone. Generally speaking, it is desirable to sulfonate at as low a temperature as possible, consistent with keeping the viscosity low enough to get extremely good mixing. Different materials have different viscosities as the reaction progresses, and require different operating temperatures. Fatty alcohols, for example, lauryl and tallow, when sulfated have little viscosity increase as the reaction progresses, and the initial reaction temperature is about the same as the final temperature. Alkyl benzene, on the other hand, can be introduced at much lower temperatures due to its low melting point, but its viscosity rises excessively as the reaction progresses, and thus the temperature must be allowed to rise in the final stages of reaction.

It has been well known that in the prior art sulfonation processes complete reaction of the reactants has been practically impossible. The reason for this is that as the reaction progresses the viscosity of many reactants increases which, in turn, causes poor mixing unless other conditions in the process are changed. Accordingly, prior to the instant invention, no method of successfully controlling the viscosity of reactants in a single mixing stage by controlling the temperature of same during sulfonation was known. The instant process, by the use of controlled addition of organic reactant and sulfur trioxide, thorough and vigorous agitation of the resulting reaction mixture in the form of a thin film, and immediate cooling after the mixing thereof, has successfully given the answer to viscosity control of the reactants in order to produce sulfonated products of superior quality.

While the aforementioned features of the present invention are extremely essential, the most important aspect of this invention is to have the temperature of the reactants sufficienly high for a very short period of time prior to the rapid cooling step so that excellent mixing can take place due to the lowered viscosity of the reactants. As a result of careful study, it has been found that the viscosity characteristics of the material to be sulfonated are extremely important, and a determination of each material's optimum temperature is essential to obtain superior mixing conditions. It has been found generally that higher temperatures usually result in poor sulfonation products; therefore, it is most desirable to effect the sulfonation at as low a temperature as possible.

For example, in the prior art a maximum temperature of around 120° F. to 130° F. is normally specified for the sulfonation of alkyl benzene having from 8 to 20 carbon atoms in the side chain. When operating at this temperature, the sulfonate formed is extremely viscous and the known methods of agitation are entirely inadequate to obtain high product quality with this high viscosity material. In contradistincion to the known methods employed in the prior art, the instant process, when using alkyl benzenes as reactants, requires that the reactants be introduced into the reaction zone at a temperature which is relatively low but sufficiently high to provide inorganic reactant having a viscosity which allows it to be mixed, that the temperature be allowed to rise to a maximum of as high as 200° F., preferably between 140° and 170° F., during the few seconds that the material is in the reactor, and that the reaction mixture thereby formed then immediately be cooled. For example, such an alkyl benzene can be introduced at ambient temperatures and the temperature will rise to around 150° to 170° F. during the few seconds that the reactant is in the reaction zone prior to cooling. By allowing the temperature to increase in this manner and then immediately cooling the reaction mixture, it surprisingly has been found that when an alkyl benzene is employed as the sulfonatable material there is a very rapid decrease in viscosity when the temperature reaches 130° to 140° F. and higher. Then, after vigorous mixing for a second or two at this high temperature, i.e., above 140° F., the material is immediately cooled to a temperature of about 120° F. It has been found that for optimum results to be achieved the temperature of the reaction must be controlled to be above about 120° F. after the reaction of such a sulfonatable material is about 60% complete. Little degradation is found in the resulting product.

With respect to the sulfonation of an organic reactant containing an alcoholic hydroxyl group such as a fatty alcohol containing from about 8 to about 20 carbon atoms, e.g., lauryl alcohol and tallow alcohol, it has been found that the temperature in the reaction zone must be maintained within the range of from about 85° F. to about 145° F., with the temperature being at most about 135° F. after the reaction of the sulfonatable material is about 60% complete for optimum results to be obtained. For the sulfonation of an ethoxylated alkyl phenol, optimum results are obtained when the temperature in the reaction zone is in the range of from about 90° to about 180° F., and above about 120° F. after the reaction is about 60% complete. In the case of other aromatic organic reactants and organic reactants having an olefinic linkage which yield surface active agents upon the sulfonation thereof, the optimum conditions involve the utilization of reaction zone temperatures in the range of from about 80° F. to about 200° F., with the temperature being at least about 120° F. after 60% of the reaction has been completed.

In accordance with the present method any suitable means may be satisfactorily employed to effect the thorough and vigorous mixing of the streams of organic reactant and sulfur trioxide/inert diluent mixture and form the film of the resultant thoroughly mixed reaction mixture in the reaction zone. It has been found that it is important that the reaction zone be externally cooled and that the reaction mixture film be contacting the cooled walls of the reaction zone to dissipate the heat of reaction and preclude the temperature of the reaction products thereby formed from rising too rapidly and uncontrollably which would result in a final product of inferior quality and color. It is preferred that the reaction zone be externally cooled in such a manner that a temperature gradient exists over the length of the reaction zone. Specific examples of such suitable means contemplated to be utilized in the present invention as the mixer-reactor include the rotating blade-type mixers exemplified by that disclosed in applicants' co-pending application Ser. No. 244,096, and the turboannular flow-type mixers exemplified by that disclosed in U.S. Patent No. 2,923,728. With certain of the mixer-reactors utilized in embodiments of the present method, such as the turboannular flow-type reactors, an inert gas of the type which is present in the sulfur trioxide feed stream also may be used as a driving and carrying expedient for the organic material feed stream. As stated above, the thickness of the film of the reaction mixture in the reaction zone contemplated for utilization in the present method is at most about 0.04 inch, and preferably from about 0.001 to about 0.01 inch.

The residence time of the reaction mixture in the reactor suitably may be in the range of from about 0.1 second to about 10 seconds, and preferably from about 0.4 second to about 2 seconds. Extensive tests have disclosed that if the reaction mixture is in the reactor for a longer period of time or for the same period of time without being cooled immediately at the end of this time period, product degradation takes place. The residence time of the main gas stream in the reactor is much less than that of the liquid reaction mixture. The actual superficial gas velocity of the sulfur trioxide/inert diluent mixture employed may vary depending primarily upon the type of mixer-reactor being utilized. For example, when mixer-reactors of the rotating blade-type are employed, the reactant feed gas velocity preferably is at least about 75 feet per second, and more preferably in the range of from about 75 to about 300 feet per second. This gives the main feed gas stream a residence time of only about 0.01 to about 0.05 second in the reactor. In embodiments wherein a turboannular flow-type reactor is employed the superficial gas velocity of the reactant gas stream preferably is within this same range.

Another outstanding feature of the instant invention is the discovery that the reactant, i.e., sulfonatable material, should enter the system with a relatively high velocity in a stream of gas diluent so that none of the sulfur trioxide will diffuse into the entering stream of reactant, where it would be apt to react in a zone where there is not a high degree of mixing. Thus, the sulfonatable reactant preferably is passed into the reaction zone with an inert gas stream. The inert gas employed for such a purpose suitably may be the same or different from the inert diluent used in the sulfur trioxide/inert diluent feed stream. Specific examples of such gases are air, nitrogen, carbon dioxide, and the like.

The invention contemplates embodiments wherein the sulfur trioxide/inert diluent mixture flows into the reaction zone through a single or a plurality of inlet points leading directly to the reactor. The sulfur trioxide inlet points are adapted to control the amount of sulfonating agent added to the mixture. Uniform concentration is necessary to reduce localized overheating at the point of injection, and ease the problem of mixing the reactants.

In accordance with the method of the present invention, at the end of the above-described mixing period of said reaction mixture in said reaction zone, all of the resultant materials are removed from the reaction zone and the materials recovered from the reaction zone immediately are rapidly cooled, i.e., within a matter of seconds, in a cooling zone to prevent degradation of sulfonation products present. The rapid cooling may be carried out by any suitable manner, such as by immediately passing the materials into and drowning same with mixing in a relatively cool mass of sulfonic acid corresponding to that present in the reaction mixture, whereby the reaction mixture is contacted and quench cooled thereby, or by immediately passing the reaction mixture rapidly through a heat exchanger wherein it contacts a large cooling surface which effects a rapid reduction in the temperature of the mixture. Preferably, the rapid cooling is carried out by means of a quench cooling technique.

The actual temperature to which the reaction mixture from the reaction zone must be cooled in the cooling zone in a particular case is that requisite to prevent product degradation from occurring and, hence, varies depending upon, inter alia, the particular organic reactant employed, the amount of sulfonating agent employed, the reaction zone exit temperature of the reaction mixture, and the residence time of the reaction mixture in the reaction zone. Usually the reaction mixture is cooled to a temperature of below about 130° F. and preferably in the range of from about 100° to about 125° F.

In preferred embodiments of the method, wherein the cooling step is carried out utilizing a quenching bath in the cooling zone, the temperature and relative amount of sulfonic acid coolant employed in the quench cooling zone is such that a sufficient mass thereof is present whereby the reaction mixture is drowned when contacted therewith to effect substantially instantaneously, i.e., within a matter of seconds, the requisite cooling of the reaction mixture. In accordance with the more preferred embodiments of the present invention the sulfonic acid cooling mass has a temperature of from about 2° to about 15° F. lower than that to which the reaction mixture is desired to be cooled thereby. The relative amount of sulfonic acid employed to effect the desired cooling at such temperatures usually is such as to provide a weight ratio of said cooling mass to said reaction mixture in the range of from about 4:1 to about 50:1.

Any suitable expedient means can be utilized to effect the quench cooling of the reaction mixture in the cooling zone. For example, either or both of the reaction mixture and the sulfonic acid cooling mass may be introduced into the cooling zone as a spray to effect the requisite mixing of the two streams. The reaction mass also suitably may be introduced as a jetted stream into a swirling mass or film of the sulfonic acid.

In embodiments of the invention wherein the cooling step is carried out in a heat exchanger, the heat exchanger is characterized by a sufficiently large cooling surface to effect the requisite cooling of the reaction mixture. When water-cooled heat exchangers are employed for this purpose, it is preferred that the temperature of the cooling water not be less than about 35° F.

The residence time of the reaction mixture in the cooling zone in accordance with the present invention usually, and preferably, is only on the order of magnitude of several seconds. In preferred embodiments of the present invention, the reaction mixture then is immediately withdrawn from the cooling zone and passed to a separation zone to effect the removal of the inert diluent and unreacted sulfur trioxide.

The separation of the inert diluent and unreacted sulfur trioxide present from the mixture recovered from the cooling zone suitably may be carried out by any expedient means known to the art for rapidly separating gases from liquids, such as those involving centrifuging and the like techniques.

In embodiments of the invention wherein the organic reactant is free of alcoholic hydroxyl groups a liquid stream rich in sulfonic acid then is removed from the gas separation zone and at least a portion thereof is passed directly to a digestion zone wherein it advantageously is maintained while being mixed for a time period so that additional reaction of ingredients in the resultant sulfur trioxide-free mixture may take place. As described below, while all of the liquid stream removed from the gas separation zone suitably may be passed to the digestion zone, the invention contemplates embodiments wherein a quench cooling technique is employed in the above described cooling step wherein a portion thereof is suitably cooled and then recycled as at least a portion of the sulfonic acid coolant liquid mass introduced into the quench cooling zone to contact and cool additional reaction mixture introduced thereinto.

The sulfonic acid-containing liquid obtained from the gas separation zone is maintained with cooling in the digester at a temperature sufficiently low to preclude degradation of the acid product. The maximum temperature usually employed is about 135° F. The preferred digestion temperature is between about 100° and 125° F. The effect of digestion is to lower the inorganic salt content of the neutralized product as well as to reduce the free oil content. The reactions which take place during the digestion of the sulfonic acid-containing mixture are relatively complex, but, briefly, there is involved the reaction of sulfonic anhydrides which are formed during sulfonation with some of the unreacted hydrocarbon. If left undigested, subsequent water addition to the anhydride-containing material breaks down the anhydride to form an organic sulfonic acid and sulfuric acid, the latter of which forms undesirable sodium sulfate upon neutralization of the product mixture. About 92 to 96% of the reaction takes place in the mixer-reactor and about 1 to 4% takes place in the product cooler before the sulfur trioxide gas is separated. The final 0.5 to 1.5% of the reaction takes place in the digester. The majority of the anhydride breaks down immediately in t1e cooling tank, and the rest at a reduced rate in the digester. If a digestion temperature of about 135° F. is employed there will be a somewhat lower sulfate and free oil content in the final product, but the product color will also be inferior. The optimum degree of digestion, or the length of time necessary for complete digestion, is determined on the basis of the characteristics of each material to be sulfonated. In preferred embodiments of the invention, particularly when an alkyl benzene is employed as the organic reactant, the digestion time is below about 30 minutes, usually from about 1 to about 30 minutes.

The reaction in the digester is effected much more rapidly if vigorous mixing is employed. The reason for this is that diffusion of the viscous sulfonic acid solution is extremely slow and thereby controls the rate of reaction.

When the fusion is aided by agitation the rate at which the reaction takes place increases considerably.

It is also important that during digestion the portion of digested material leaving the digester is not mixed back with the undigested material entering same, which back-mixing undesirably would reduce significantly the reaction rate attained in the digester.

The addition of amounts, usually ranging up to amounts which are approximately equivalent to the anhydride content of the reaction mixture, e.g., from about 1 to about 2% by weight based on the originally entering organic reactant, of a sulfonatable reactant including, without limitation, alcohols such as fatty alcohols, as well as benzene, toluene or xylene, in the last stage of the digestion step will further cut down the inorganic salt content of the final product by their reaction with the anhydrides to form corresponding organic sulfates and/or sulfonates. Moreover, in order to completely break down all of the remaining anhydrides, a final water addition may be employed.

In embodiments of the present invention wherein the organic reactant contains an alcoholic hydroxyl group, a liquid stream containing an organic sulfuric acid is recovered from the gas separation zone, the digestion step usually preferably is bypassed, and the liquid stream immediately is neutralized. However, if it is entered into the digester, the period of time it remains therein generally should be relatively short.

An instance wherein it is desirable to digest sulfuric acid products obtained in accordance with the present invention is when a fatty alcohol is employed, preferably one having from about 8 to about 20 carbon atoms, as the organic reactant, and the digestion of the resultant sulfate-containing mixture is carried out by combining and mixing same in the digestion zone with a sulfonated alkyl benzene prepared in accordance with the invention in a reaction zone connected parallel to the reaction zone in which the alcohol sulfation is conducted. As stated above, fatty alcohols tend to rapidly degrade in color when an excess of the sulfur trioxide is utilized to effect complete sulfation thereof. By completing the sulfation of the fatty alcohol in said embodiments of the invention in the presence of the sulfonated alkyl benzene which contains sulfonic acid anhydrides, a final product having both good color and a low level of unreacted oil is obtained.

To accomplish such results in such embodiments of the invention, the sulfation of the fatty alcohol is carried out using a mole ratio of sulfur trioxide to alcohol of about 0.85:1 to about 1:1, and the sulfonation of the alkyl benzene is conducted utilizing an excess of sulfur trioxide, preferably in an amount corresponding to a mole ratio of sulfur trioxide to alkyl benzene of from about 1.05:1 to about 1.15:1. The two reaction streams are each separately and rapidly cooled, then either separately or in combination separated from excess sulfur trioxide and thereafter digested with agitation in combination in the digestion zone in a manner which prevents back-mixing. The digestion of the mixed streams generally varies from about 1 to about 30 minutes. The actual digestion time employed depends upon, inter alia, the amount of sulfur trioxide used in each reaction, the digestion temperature, and the nature of the particular organic reactants. When lower relative amounts of sulfur trioxide are employed, longer digestion times are utilized; when higher amounts of sulfur trioxide are used, the reverse is true in order to attain completion of the sulfation. The digestion temperature suitably may vary from about 110° to 135° F., depending upon the alcohol employed, and the mixing ratio of alcohol to alkyl benzene. In the digestion step, unreacted fatty alcohol reacts with anhydride formed in the alkyl benzene sulfonation. Usually, the fatty alcohol and alkyl benzene reaction mixtures are mixed for digestion in approximately equal mole proportions but any mixing ratio suitably may be employed.

In certain embodiments of the present invention wherein a fatty alcohol is employed as the organic reactant, it also is advantageous to recycle a portion of the sulfated product obtained in the process from the gas separation zone and/or the digestion zone if digestion is employed, to the reaction zone wherein it is introduced with additional organic alcohol reactant.

The sulfonated product obtained in the digestion step or, in some embodiments wherein the organic reactant contains an alcoholic hydroxy group, the product obtained from the gas separation zone then may be passed to a neutralization zone wherein it is reacted with a requisite amount of an alkali such as an aqueous solution of sodium hydroxide in accordance with conventional neutralization techniques to provide the corresponding sulfonate salt in the form of a substantially completely sulfonated product.

While the above discussion generally has been limited to a description of a process wherein only a single mixer-reactor is employed as the reaction zone it will be understood that the invention contemplates embodiments wherein a plurality of mixer-reactors are connected in parallel and are adapted to discharge the reaction mixtures formed therein into a common cooling zone and/or digestion zone.

A more detailed description of an embodiment of the process of the present invention will be given with reference to the accompanying drawing which diagrammatically represents a flow sheet of the instant method.

With reference to the drawing, a continuous stream of inert diluent (e.g., air, nitrogen, etc.) entering the system through pipe 10 flows through a compressor 11 wherein the inert diluent is compressed to the desired pressure. Thereafter, the compressed, cooled inert diluent flows to a cooler 12. The compressed, cooled inert diluent then flows into a moisture trap 13 wherein excess water is removed, thereafter to an oil filter 14 to remove other impurities, especially free oil and dust, next to a dryer 15 whereby the compressed inert diluent is dried prior to passage into the sulfonation zone. The inert diluent leaving dryer 15 is split into two streams, one of which goes through a rotameter 16 and then to a sulfur trioxide vaporizer 17. The other of said streams goes through a rotameter 18 and thereafter is mixed with the incoming organic reactant material entering through pipe 25. The major portion of the inert diluent entering through pipe 10 goes through a rotameter 19 and to the vaporized sulfur trioxide/inert diluent stream 20 in order to further dilute the sulfur trioxide to the proper value, prior to its entry into a reactor 24. Sulfur trioxide entering the system through pipe 21 is introduced into a proportioning pump 22 and passes to a vaporizer 17 wherein inert diluent is introduced as heretofore described, thereafter is fed under pressure into the stream 20 for further dilution, and then through a mist eliminator 23 before entering reactor 24.

The organic reactant is introduced into a proportioning pump 26 wherein it is mixed with inert diluent entering through pipe 27. The organic reactant/inert diluent mixture passes through a cooler 28, under pressure, to reactor 24. For the purpose of effecting further cooling, i.e., to remove a portion of the heat of reaction, reactor 24 is provided with a water jacket 29. The sulfur trioxide/inert diluent mixture enters reactor 24 through multiple inlets 30 and 31, and the two mixtures are subjected to thorough and vigorous mixing to provide a thin film of resultant reaction mixture in contact with the walls of reactor 24. The reaction mixture is allowed to remain in reactor 24 for no longer than about 10 seconds and the entire reaction mixture in mixer 24 then immediately is passed to a quench cooler 36 and is instantaneously drowned in a large mass of sulfonic acid present therein which is cooled by coils 37. Additional cooling is effected, if desired, by recycling sulfonic acid coolant through a cooler 39. Thereafter, the recycled sulfonic acid is passed by pump 40 back into cooler 36. The time during which the reaction mixture is in cooler 36 is extremely short, that is, on the order of a few seconds. The mixture of cooled sulfonic acid and air is recovered from cooler 36 and is introduced into a centrifugal separator 41 whereby waste air containing a small portion of sulfur trioxide is removed through outlet 42. The sulfonic acid exits from the bottom of separator 43 through pipe 43', and at least a portion thereof enters a digester 44 wherein it passes through a series of compartments, to minimize backmixing, at temperatures below 135° F. for a period of up to 30 minutes.

If desired, the sulfonic acid stream coming from separator 41 may be split into two or three streams. A stream may be split off and recycled through pipe 62 back to reactor 24, another stream may be split off and recycled through pipes 62 and 100 and cooler 39 to quench cooler 36, and one stream is passed to digester 44 by means of pipe 60. Digester 44 is cooled during the mixing stages by means of cooling coils 48, and cold water is continuously added by way of inlet 45 and removed through outlet 46. During this stage of the reaction approximately 0.5 to 1.0% of the original organic reactant reacts with the sulfonic anhydride formed in the process. The sulfonic acid mixture in digester 44 is transferred to a second digester 49 wherein 1 to 2% by weight of sulfonatable reactant, such as benzene, toluene, xylene, or fatty alcohol, is simultaneously introduced and added to the sulfonic acid mixture and further digestion is effected.

Digester 49 is cooled by coils 51 and cold water is continuously added through inlet 52 and removed through outlet 53. Most of the remaining acid is removed in the second digester and the resulting product is passed to a mixer 54 where it is mixed with water which enters through inlet 55, to decompose any remaining anhydrides. Mixer 54 is equipped with internal cooling coils 56 to maintain a controlled temperature. The resulting product is removed from the mixer 54 and passed to neutralizer 56 through pipe 57, to which neutralizer caustic soda is added through inlet 58 to obtain the desired pH. Thereafter, the sulfonated product is discharged as neutralized slurry through outlet 59.

When employing an alcoholic hydroxyl-containing material as the organic reactant, the digester preferably is bypassed, as at 61, and the reaction mixture sent directly to neutralizer 56, except when an alcohol is being co-sulfonated as previously mentioned.

In order to further disclose the present invention, the following examples are illustrative of the practice of the invention. It will be understood, of course, that numerous other examples will readily occur to those skilled in the art in the light of the guiding principles and teachings set forth herein. The examples, therefore, are not to be construed as restricting in any manner the proper scope of the invention.

*Example 1*

A mixture of alkyl benzenes having from 8 to 18 carbon atoms in the side chains and a nominal value of about 13 carbon atoms in the side chains is sulfonated with sulfur trioxide derived from stabilized $SO_3$. An air/sulfur trioxide mixture enters a reactor at 98° F. under a pressure of about 20 pounds per square inch gauge. The $SO_3$ concentration in the air is 5% by volume. Twelve percent excess $SO_3$ over theoretical is employed for the sulfonation. Before the air/sulfur trioxide mixture enters the reactor, it is passed through a mist eliminator which removes any sulfuric acid fog from the stream. In this example, a mixer-reactor of the type described in applicants' co-pending application Ser. No 244,096 is employed, having six inlets for the air/sulfur trioxide feed streams. The alkyl benzene enters at ambient temperature in a stream of cooled air. The residence time in the reactor is about 2 seconds. The reactor has a maximum clearance of .01 inch, and the $SO_3$/air velocity is 175 feet per second. The mixture of sulfonic acid and air, with a little excess $SO_3$, obtained from the reactor has a temperature of about 160° F. and is immediately cooled in a quench cooling tank containing cool sulfonic acid corresponding to that in the reaction mixture in an amount corresponding to provide a weight ratio of said sulfonic acid to said reaction mixture of about 10:1. The initial temperature in the tank of the sulfonic acid coolant is 120° F. and the entering reaction mixture is immediately mixed into this large mass of acid coolant and is diluted and cooled to 120° F. almost instantaneously. A mixture of air (with some $SO_3$ remaining in it) and sulfonic acid is removed from this tank and passed to an air separator, where the air/sulfur trioxide mixture is removed and passed to waste, and the sulfur trioxide-free sulfonic acid dropped out to the bottom. The separated sulfonic acid is then digested in a violently agitated mixer with multiple compartments for 12 minutes, after which 1% toluene, based on the originally entering alkyl benzene, is added and the resultant mixture is digested for an additional 12 minutes. Following this final digestion, a small amount, approximately 2% based on the originally entering alkyl benzene, of water is added to break the anhydrides still remaining, and the resulting mixture is then neutralized with caustic soda. The analysis of the product is as follows:

Free oil—1.3% on the basis of active ingredient.
Color—70 Klett for a 5% solution and a 40 mm. light path, using No. 42 blue filter.
Ratio of active ingredient to sodium sulfate—98.5:1.5.

*Example 2*

In this example, commercial xylene containing some of each of the isomers is sulfonated using the reactor described in Example 1 with $SO_3$ prepared by vaporizing stabilized liquid sulfur trioxide. The $SO_3$ concentration in the air is 4% by volume and no excess $SO_3$ is employed. Xylene enters the reactor with a stream of air at 40° F. The residence time of the reaction mixture in the reactor is about 2 seconds. The reaction mixture is recovered from the reactor at a temperature of about 130° F. and, after leaving the reactor, the reaction mixture immediately is cooled to below 120° F. by mixing it in a quenching tank with cool sulfonic acid, as in Example 1. After cooling, the xylene sulfonate is separated from the air stream in a separator. The xylene sulfonate mixture is digested for 2 minutes in a digester, as set forth in Example 1. The exiting air/sulfur trioxide stream is passed through an adsorber to remove free xylene. The other details of the processing are the same as set forth in Example 1, and the xylene sulfonic acid is neutralized with sodium hydroxide or ammonium hydroxide. The analysis of the neutralized product shows no free xylene and an ether extractable content of about 6%.

*Example 3*

Lauryl alcohol containing about 95% $C_{12}$ atoms is sulfated with sulfur trioxide gas prepared by vaporizing $SO_3$ from stabilized liquid sulfur trioxide. The $SO_3$ enters in an air stream containing 4% sulfur trioxide by volume. About 2% excess sulfur trioxide over theoretical is employed, and the mixer of Example 1 is used. The alcohol enters at 85° F. because of its melting point. A reaction time of about 2 seconds is employed. The sulfuric acid mixture is recovered from the reactor at a temperature of about 120° F. and is immediately cooled to below 100° F. in the quench surge pot, as in the other examples. After cooling the sulfuric acid material is separated from air and sulfur trioxide in a gas separator. A portion of the cooled reaction mixture in an amount of about 10 times the rate of feed is recycled to the organic reactant inlet of the reactor to aid in cooling the reaction and decrease the residence time of the reactants in the reactor. In this example no digestion is employed and no other ingredients are added. Following the removal thereof from the gas separator, the non-recycled acid is passed directly to the neutralizer where it is neutralized with sodium hydroxide. The product, after neutralization, has a color of 50 Klett, based on a 5% solution, and an unreacted alcohol content of about 1.2% on the active basis.

*Example 4*

Dodecyl benzene is sulfonated with $SO_3$ at a mole ratio of $SO_3$ to dodecyl benzene of about 1.1:1 in a single stage film reactor at a maximum temperature of 170° F. Simultaneously, tallow alcohol of an equal mole percentage as the alkyl benzene is sulfated with $SO_3$ at a mole ratio of $SO_3$ to alcohol of about 0.91:1 in a second single stage film reactor at a maximum temperature of 140° F. Each of the film reactors provides a reactant film thickness of less than 0.04 inch. The residence time of each of the reactants in the separate reactors is about one second. Each stream obtained from the two reactors separately is cooled to about 125° F., the cooled streams then are mixed together, and subsequently the resultant combined streams are passed through a cyclone separator wherein excess $SO_3$ is removed. The stream obtained from the gas separator is then passed to a digester and maintained therein for 12 minutes at a temperature of 125° F. An analysis of the product obtained shows it to have an unreacted oil content on the active basis of about 2.5% and a Klett color for a 5% solution and a 40 mm. light path of about 80.

It is to be understood that the foregoing detailed description is given merely by way of illustration and that many variations may be made therein without departing from the spirit of this invention.

What is claimed is:

1. A continuous process for sulfating an organic reactant having an alcoholic hydroxyl group wherein said organic reactant is reacted with sulfur trioxide to provide a corresponding organic sulfuric acid compound which comprises simultaneously and continuously introducing into an externally cooled reaction zone (1) a stream of said organic reactant and (2) a stream of a gaseous mixture of sulfur trioxide and an inert diluent, from which any mist present previously has been removed, without premixing said streams, at a temperature which reduces the viscosity of said organic reactant sufficiently to effect optimum mixing, thoroughly mixing said organic reactant-containing and said sulfur trioxide-containing streams in said reaction zone for a time period of at most about 10 seconds to provide a reaction mixture in the form of a thin film, removing said reaction mixture from said reaction zone at the end of said time period, immediately introducing said reaction mixture withdrawn from said reaction zone into a quench cooling zone to effect a rapid cooling of said reaction mixture to a temperature below about 130° F. and provide a substantially non-degraded organic sulfuric acid-rich product, withdrawing said sulfuric acid-rich product from said quench cooling zone, separating said gaseous inert diluent containing any un-reacted sulfur trioxide therefrom, and thereafter neutralizing at least part of the resultant sulfur trioxide-free, sulfuric acid-rich product.

2. The process according to claim 1 wherein the organic reactant is a fatty alcohol having from about 8 to about 20 carbon atoms and the temperature in the reaction zone is maintained within the range of about 85° F. to about 145° F.

3. The process according to claim 1 wherein the organic reactant is an ethoxylated alkyl phenol and the temperature in the reaction zone is maintained within the range of about 90° F. to about 180° F.

4. The process according to claim 1 wherein said reaction mixture is cooled to a temperature in the range of from about 100° F. to about 125° F. in said cooling zone.

5. The process according to claim 1 wherein said cooling of said reaction mixture withdrawn from said reaction zone is carried out by contracting and mixing said reaction mixture in said cooling zone with a cool mass of organic sulfuric acid corresponding to that in said reaction mixture.

6. The process according to claim 1 wherein at least a part of the sulfonic-acid rich mixture withdrawn from the cooling zone and introduced into the separation zone is recycled back to the cooling zone wherein said recycled mixture aids in cooling the fresh reaction mixture being introduced into the cooling zone.

7. A continuous process for substantially completely sulfating a fatty alcohol having from about 8 to about 20 carbon atoms wherein said fatty alcohol is reacted with sulfur trioxide to form a corresponding sulfuric acid compound which comprises introducing into an externally cooled reaction zone (1) a stream of said fatty alcohol in liquid form and (2) a stream of a mixture of sulfur trioxide and air from which any mist present previously has been removed, the stream of sulfur trioxide and air entering said reaction zone at a temperature of about 90° F. to about 120° F., the concentration of sulfur trioxide in said sulfur trioxide/air mixture being in the range of from 2 to about 8% by volume, at a pressure of at most about 75 pounds per square inch thoroughly mixing said fatty alcohol and said sulfur trioxide/air mixture in said reaction zone for a period of at most about 10 seconds to provide a reaction mixture in the form of a film having a thickness of at most about 0.04 inch, said mixture of sulfur trioxide and air being introduced into said reaction zone at a velocity of at least 75 feet per second said reaction mixture being maintained in said reaction zone at a temperature in the range of from about 85° F. to about 145° F. and a temperature of at most about 135° F. after the reaction is about 60% complete, removing said reaction mixture from said reaction zone at the end of said time period, immediately introducing said reaction mixture withdrawn from said reaction zone into a cooling zone wherein said reaction mixture is contacted and mixed with a cool mass of sulfuric acid corresponding to that in said reaction mixture to effect a rapid cooling of said reaction mixture to a temperature in the range of from about 100° F. to about 125° F. and to provide a substantially non-degraded sulfuric acid-rich product, withdrawing said sulfuric acid-rich product from said cooling zone, separating said air containing any unreacted sulfur trioxide therefrom, and thereafter neutralizing at least a part of the resultant sulfur trioxide-free, sulfuric acid-rich product.

8. A continuous process for sulfonating a sulfonatable organic reactant selected from the group consisting of olefins, aromatic hydrocarbons and unsaturated fatty acids, wherein said organic reactant is reacted with sulfur trioxide to provide a corresponding sulfonic acid, which comprises introducing into an externally cooled reaction zone (1) a stream of said organic reactant and (2) a stream of a mixture of sulfur trioxide and a gaseous inert diluent, from which any mist present previously has been removed, thoroughly mixing said organic reactant-containing and said sulfur trioxide-containing streams in said reaction zone for a time period of at most about 10 seconds to provide a reaction mixture in the form of a thin film, removing said reaction mixture from said reaction zone at the end of said time period, and immediately introducing said reaction mixture withdrawn from said reaction zone into a quench cooling zone to effect a rapid cooling of said reaction mixture to a temperature below about 130° F. and provide a substantially non-degraded sulfonic-acid rich mixture, withdrawing said sulfonic-acid rich mixture from said quench cooling zone, passing the same through a separation zone and separating said gaseous inert diluent containing any un-reacted sulfur trioxide therefrom, and digesting at least a part of the resulting mixture in an agitated digestion zone without substantial back-mixing to provide a product richer in sulfonic acid than that introduced into the digestion zone.

9. The process, according to claim 8, wherein at least a part of the sulfonic-acid rich mixture withdrawn from the cooling zone and introduced into the separation zone is re-cycled back to the cooling zone wherein said recycled mixture aids in cooling the fresh reaction mixture being introduced into the cooling zone.

10. The process according to claim 8 wherein the reaction mixture in the form of a thin film has a thickness of at most about 0.04 inch and wherein the digestion of the sulfonic acid-rich mixture is at a temperature of from about 100° to about 135° F. for a time period in the range of from about 1 to about 30 minutes to provide a sulfonic acid-rich product.

11. The process according to claim 8 wherein said cooling of said reaction mixture withdrawn from said reaction zone is carried out by contacting and mixing said reaction mixture in said cooling zone with a cool mass of sulfonic acid corresponding to that in said reaction mixture.

12. The process according to claim 8 wherein during said digestion step a sulfonatable organic reactant is added to said sulfonic acid-rich mixture in said digestion zone, and at the end of said digestion time period the resultant sulfonic acid product is neutralized.

13. A continuous process for substantially completely sulfonating an alkyl aryl hydrocarbon having from 8 to 20 carbon atoms in the alkyl group wherein said alkyl aryl hydrocarbon is reacted with sulfur trioxide to form a corresponding sulfonic acid, which comprises introducing into an externally cooled reaction zone (1) a stream of said alkyl aryl hydrocarbon in liquid form and (2) a stream of sulfur trioxide and air wherein said trioxide and air enters said reaction zone at a temperature of about 90° F. to about 120° F., thoroughly mixing said alkyl aryl hydrocarbon-containing and said sulfur trioxide-containing streams for a time period of at most about 10 seconds to provide a reaction mixture in the form of a thin film, said reaction mixture being maintained in said reaction zone at a temperature in the range of 80° F. to about 200° F. and a temperature of at least about 120° F. after the reaction is about 60% complete, removing said reaction mixture from said reaction zone at the end of said time period, immediately introducing said reaction mixture withdrawn from said reaction zone into a cooling zone wherein it is contacted and mixed with a cool mass of sulfonic acid corresponding to that in said reaction mixture to effect a rapid cooling of said reaction mixture to a temperature in the range of from about 100° F. to about 125° F. and to provide a substantially nondegraded sulfonic acid-rich mixture, withdrawing said sulfonic acid-rich mixture from said cooling zone, separating air containing any unreacted sulfur trioxide therefrom, and digesting at least a portion of the resultant sulfur trioxide-free, sulfonic acid-rich mixture in an agitated digestion zone without substantial back-mixing at a temperature in the range of from about 100° F. to about 135° F. for a time period in the range of from about 1 to about 30 minutes to provide a sulfonic acid product.

14. The process according to claim 13 wherein during the digestion step a sulfonatable organic reactant is added to said sulfonic acid-rich mixture in said digestion zone and at the end of said digestion time period the resultant sulfonic acid product is neutralized.

15. A continuous process for the co-sulfonation of an alkyl aryl hydrocarbon having from 8 to 30 carbon atoms in the alkyl group and fatty alcohol sulfate with sulfur trioxide to produce the corresponding sulfonic acid which comprises introducing into one externally cooled reaction zone (1) a stream of said alkyl aryl hydrocarbon in liquid form and (2) a stream of sulfur trioxide and air and separately introducing into a second externally cooled reaction zone, (3) a stream of fatty alcohol and (4) a stream of a mixture of sulfur trioxide and an inert diluent thoroughly mixing streams (1) and (2) in said reaction zone to provide a reaction mixture in the form of a thin film, thereafter removing said reaction mixture from said reaction zone and immediately cooling said reaction mixture and to provide a substantially non-degraded sulfonic acid-rich mixture, withdrawing said mixture from said cooling zone, separating air containing any unreacted sulfur trioxide therefrom and thereafter digesting at least a portion of such mixture in an agitated digestion zone in the presence of the reaction product produced in said second reaction zone from the interaction of streams (3) and (4), said reaction product being sulfatable and having been produced in the form of a thin film which has been rapidly cooled prior to the addition of said sulfonic acid-rich mixture in the digestion zone, said sulfatable reaction product being sulfated during said digestion.

16. A process as defined in claim 15 wherein the mole ratio of $SO_3$ to alkyl aryl hydrocarbon in streams (1) and (2) being in the range of about 1.05:1 to 1.15:1 and the mole ratio of $SO_3$ to fatty alcohol in streams (3) and (4) being in the range of about 0.85:1 to 1:1.

References Cited

UNITED STATES PATENTS

| | | | |
|---|---|---|---|
| 2,088,027 | 7/1937 | Law et al. | 260—459 |
| 2,448,184 | 8/1948 | Lemmon | 260—686 X |
| 2,613,218 | 10/1952 | Stoneman | 260—457 X |
| 2,691,040 | 10/1954 | Bloch et al. | 260—459 X |
| 2,768,199 | 10/1956 | Luntz et al. | 260—686 X |
| 2,828,331 | 3/1958 | Marisic et al. | 260—400 X |
| 2,923,728 | 2/1960 | Falk et al. | 260—459 |
| 3,024,258 | 3/1962 | Brooks et al. | 260—459 X |
| 3,058,920 | 10/1962 | Brooks et al. | 260—686 X |
| 3,169,142 | 2/1965 | Knaggs et al. | 260—686 X |

FOREIGN PATENTS

| | | |
|---|---|---|
| 230,108 | 8/1960 | Australia. |
| 553,598 | 5/1943 | Great Britain. |
| 799,038 | 7/1958 | Great Britain. |
| 799,199 | 8/1958 | Great Britain. |

CHARLES B. PARKER, *Primary Examiner.*

F. D. HIGEL, *Assistant Examiner.*